(12) United States Patent
Sakurai et al.

(10) Patent No.: US 7,161,749 B2
(45) Date of Patent: Jan. 9, 2007

(54) IMAGE PICKUP APPARATUS

(75) Inventors: Nobumasa Sakurai, Saitama (JP);
Yukio Yamada, Kanagawa (JP); Kaizo Tsukamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/535,313

(22) PCT Filed: Oct. 14, 2004

(86) PCT No.: PCT/JP2004/015567

§ 371 (c)(1),
(2), (4) Date: May 17, 2005

(87) PCT Pub. No.: WO2005/036253

PCT Pub. Date: Apr. 21, 2005

(65) Prior Publication Data
US 2006/0007551 A1   Jan. 12, 2006

(30) Foreign Application Priority Data
Oct. 14, 2003   (JP)  ............................. 2003-353684

(51) Int. Cl.
G02B 7/02 (2006.01)
G02B 23/16 (2006.01)
G03B 11/04 (2006.01)
G03B 17/00 (2006.01)

(52) U.S. Cl. ...................... 359/818; 359/511; 359/611; 359/738; 396/448; 396/534

(58) Field of Classification Search .............. 359/511, 359/600, 611, 738–740, 800–819, 827–830; 396/448, 534
See application file for complete search history.

(56) References Cited

U.S. PATENT DOCUMENTS

| | | | | |
|---|---|---|---|---|
| 2,291,821 A | * | 8/1942 | McNabb | 359/511 |
| 2,707,418 A | * | 5/1955 | Magnuson | 359/818 |
| 3,614,196 A | * | 10/1971 | Schlapp | 359/611 |
| 3,828,991 A | * | 8/1974 | Moore | 224/610 |
| 4,381,885 A | | 5/1983 | Coquin et al. | 359/892 |
| 4,416,528 A | * | 11/1983 | Breslau et al. | 396/544 |
| 4,526,440 A | * | 7/1985 | Lundberg et al. | 359/827 |
| 4,909,617 A | * | 3/1990 | Boyd | 359/511 |
| 5,126,881 A | * | 6/1992 | Crema | 359/611 |

(Continued)

FOREIGN PATENT DOCUMENTS

| | | | | |
|---|---|---|---|---|
| JP | 6-51386 | * | 2/1994 | 359/611 |
| JP | 11-236909 | * | 8/1999 | 359/828 |
| JP | 2000-180918 | * | 6/2000 | 359/611 |

OTHER PUBLICATIONS

English translation of the Japanese reference No. 6-51386.*

(Continued)

*Primary Examiner*—Thong Q Nguyen
(74) *Attorney, Agent, or Firm*—Bell, Boyd & Lloyd LLC (57) ABSTRACT

An image pickup apparatus is provided. The image pickup apparatus permitting a conversion lens to be mounted and dismounted, wherein a lens hood is composed of a base portion on the mounting side and a tubular portion on the front side, the base portion and the tubular portion are detachably coupled to each other, and another lens is contained in the inside of the lens hood when the another lens is mounted on the front side of an optical system, whereby even when the conversion lens is being used, the lens hood can be used as it is, and the incident light contracting function of the lens hood can be maintained.

5 Claims, 9 Drawing Sheets

U.S. PATENT DOCUMENTS 5,255,120 A * 10/1993 Anzai et al. ................ 359/511
5,294,954 A * 3/1994 Nomura et al. ............. 396/448
6,243,540 B1 * 6/2001 Kume et al. ................ 396/534
6,269,227 B1 * 7/2001 Hamasaki et al. .......... 396/534

OTHER PUBLICATIONS

English translation of the Japanese reference No. 2000-180918.*
English translation of the Japanese reference No. 11-236909.*
English Abstract of Japanese reference No. 06-018960.
English Abstract of Japanese reference No. 06-051386.
English Abstract of Japanese reference No. 09-018757.
English Abstract of Japanese reference No. 09-236849.
English Abstract of Japanese reference No. 2001-013545.
"Cokin-Handbuch 106 Seiten, 454 Beispiele," front and rear covers, inside cover, pp. 1, 3, 84 and 104, Feb. 1991, Cokin Cromofilter S.A., XP002378735.

* cited by examiner

Fig.14

IMAGE PICKUP APPARATUS

CROSS REFERENCE TO RELATED APPLICATION

The present application claims priority to Japanese Patent Document No. 2003-353684 filed on Oct. 14, 2003, the disclosure of which is herein incorporated by reference.

BACKGROUND OF THE INVENTION

The present invention relates to an image pickup apparatus, particularly to an image pickup apparatus in which a lens hood is mounted on the front side of an optical system.

When a point light source is put in an object at the time of shooting by a video camera, non-imaging light reflected by an air-glass joint plane of a shooting lens or the like reaches the image pickup screen to form irregular light spots, leading to the generation of flare and to a trouble in image pickup.

Therefore, it has been an ordinary practice to mount a lens hood on the front side of the shooting lens of a video camera so as to prevent the generation of flare at the time of shooting. However, where the peripheral surface of the lens hood is long to the front side, an image pickup screen with its corner portions lost is obtained; in view of this, a short lens hood has been used.

When a short lens hood is thus mounted on the front side of the shooting lens at the time of shooting by a video camera, an image pickup screen with its corner portions not lost can be obtained, but the amount of light received by the shooting lens is so large that a point light source is easily put in to the object side, leading to the generation of flare on the image pickup screen.

In view of the above, as is disclosed, for example, in Japanese Patent Laid-open No. Hei 9-18757, a system has been proposed in which a lens hood and a dowser are provided on the front side of a shooting lens in a video camera, the incident light is contracted by the dowser, and the amount of light coming from the point light source on the object side is reduced, thereby preventing the generation of flare on the image pickup screen.

On the other hand, in some cases, a conversion lens is mounted for widening the angle of view in shooting. The conversion lens is an auxiliary optical system which is mounted on the front side of the shooting lens, and, where such an auxiliary optical system is used, it is necessary to detach the lens hood and to mount the conversion lens in the lens food mounting position. Therefore, the flare preventive function by contracting the incident light with the dowser of the lens hood cannot be expected, and the operation of detaching the lens hood is laborious.

Japanese Patent No. 2500892 discloses an auxiliary optical system mounting adapter for mounting an auxiliary optical system to a camera including a hood frame body having an opening portion corresponding to the angle of field of a shooting lens. The hood frame body is provided on the front side of the shooting lens as one body with a camera main body. The adapter includes a mount portion to which the auxiliary optical system can be detachably mounted, a positioning frame disengageably fitted in the opening portion of the hood frame body, a fixed claw capable of being disengageably engaged on one side of the peripheral edge of the opening portion, and a movable claw which can be disengageably engaged on the other side with respect to the center of the opening portion and which is displaced in the engaging-disengaging direction by being pushed by a lens-barrel of the auxiliary optical system when the auxiliary optical system is mounted.

The use of such an adapter makes it possible to mount an auxiliary optical system such as a conversion lens on the front side of the food frame body, and eliminates the need to detach the hood frame body. However, where the auxiliary optical system such as a conversion lens is used, the incident light is refracted by the conversion lens so largely that the incident light contracting effect of the hood frame body cannot be expected. Namely, the incident light contracting effect of the dowser of the lens hood cannot be displayed.

SUMMARY OF THE INVENTION

The present invention relates to an image pickup apparatus, particularly to an image pickup apparatus in which a lens hood is mounted on the front side of an optical system.

More specifically, the present invention pertains to in an embodiment an image pickup apparatus having a lens hood mounted on the front side of an optical system, wherein the lens hood is composed of a base portion on the mounting side and a tubular portion on the front side, the base portion and the tubular portion are detachably coupled to each other; and another lens is contained in the inside of the lens hood when the another lens is mounted on the front side of the optical system.

Here, it is preferable that a dowser is provided in the inside of the tubular portion of the lens hood, and the incident light is contracted by an opening of the dowser. In addition, it is preferable that the tubular portion and the base portion of the lens hood are detachably coupled to each other by a bayonet claw. Besides, it is preferable that a cap is detachably attached to the opening in the dowser of the tubular portion of the lens hood. In addition, the another lens is preferably a wide conversion lens for widening the image pickup angle.

Further, it is preferable that the dowser is provided on the inside of the tubular portion in the state of being biased in the optical axis direction, the tubular portion can be detachably coupled to the base portion irrespectively of whether the dowser is in the posture of being close to the optical system or in the posture of being apart from the optical system, and the tubular portion is coupled to the base portion in such a posture that the dowser is apart from the optical system in the case where the conversion lens is mounted on the front side of the optical system in the state of being contained in the inside of the lens hood. In addition, it is preferable that the dowser is provided on the inside of the tubular portion in the state of being biased in the optical axis direction, the tubular portion can be detachably coupled to the base portion irrespectively of whether the dowser is in the posture of being close to the optical system or in the posture of being apart from the optical system, and the tubular portion is coupled to the base portion in such a posture that the dowser is close to the optical system in the case where the conversion lens is not mounted.

In a conventional image pickup apparatus, the light-shielding function has been given priority so that it has been necessary to detach a lens hood and use a conversion lens in the case of using the conversion lens when the lens hood is used. Therefore, the lens hood effect has naturally not been expectable, and the operation of detaching the lens hood has been laborious. In view of this, in a preferred embodiment of the present invention, a part of the lens hood is structured to be attachable and detachable, and the conversion lens can be used in the condition where the lens hood of the camera is left mounted, so that, by mounting the part of the hood while reversing it between the attached state and the detached state, the light-shielding effect can be displayed irrespectively of whether the conversion lens is mounted or is not mounted.

According to such an embodiment, even in the case of using the conversion lens, the conversion lens can be contained into the lens hood so as to be used, by only detaching and attaching a part of the lens hood without removing the hood. In addition, by mounting the detachably attached part through reversion, the light-shielding effect can also be obtained. Besides, even in the case of not using the conversion lens, the light-shielding effect of the ordinary lens hood can be obtained by reversing the detached portion to the initial condition and attaching it in the initial condition.

The present invention resides in an embodiment in an image pickup apparatus having a lens hood mounted on the front side of an optical system, wherein the lens hood is composed of a base portion on the mounting side and a tubular portion on the front side, the base portion and said tubular portion are detachably coupled to each other; and another lens is contained in the inside of the lens hood when the another lens is mounted on the front side of the optical system.

Therefore, according to such an image pickup apparatus, the another lens is contained in the inside of the base portion of the lens hood, so that it suffices, in the case of mounting the another lens, to mount the another lens in the condition where the base portion of the lens hood is mounted, and thereafter to couple the tubular portion of the lens hood to the base portion. Accordingly, the light-shielding effect of the lens hood can be expected even in the case of using the another lens, and the laborious operation of detaching the hood is not needed in the case of mounting the another lens.

The present invention provides in an embodiment an image pickup apparatus so configured that it is unnecessary to detach a lens hood in the case of mounting an auxiliary optical system on the front side of an ordinary optical system.

The present invention provides in an embodiment an image pickup device so configured that an intricate operation of detaching a lens hood is unnecessary in the case of using an auxiliary optical system.

The present invention provides in an embodiment an image pickup apparatus so configured that, even in the case of using an auxiliary optical system, the contracting of the incident light by a dowser of a lens food can be achieved, thereby preventing the generation of flare on an image pickup screen.

The present invention provides in an embodiment an image pickup apparatus having a lens hood such that the position of a dowser of the lens hood can be changed according to whether an auxiliary optical system is used or is not used.

Additional features and advantages of the present invention are described in, and will be apparent from, the following Detailed Description of the Invention and the figures.

DETAILED DESCRIPTION OF THE INVENTION

The present invention relates to an image pickup apparatus, particularly to an image pickup apparatus in which a lens hood is mounted on the front side of an optical system.

Figure 1:
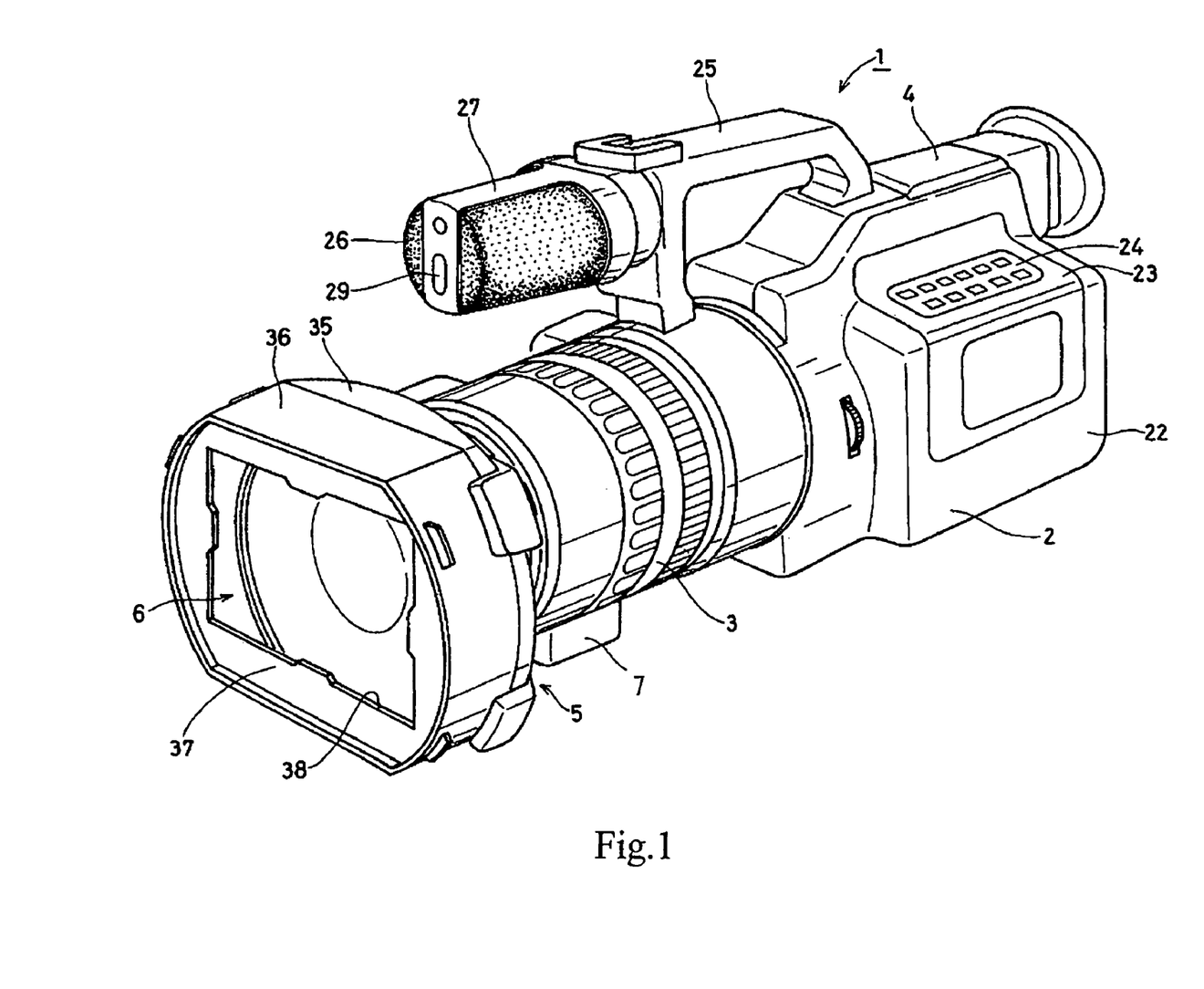
FIG. 1 is a perspective view showing the overall configuration of a video camera.
Figure 2:
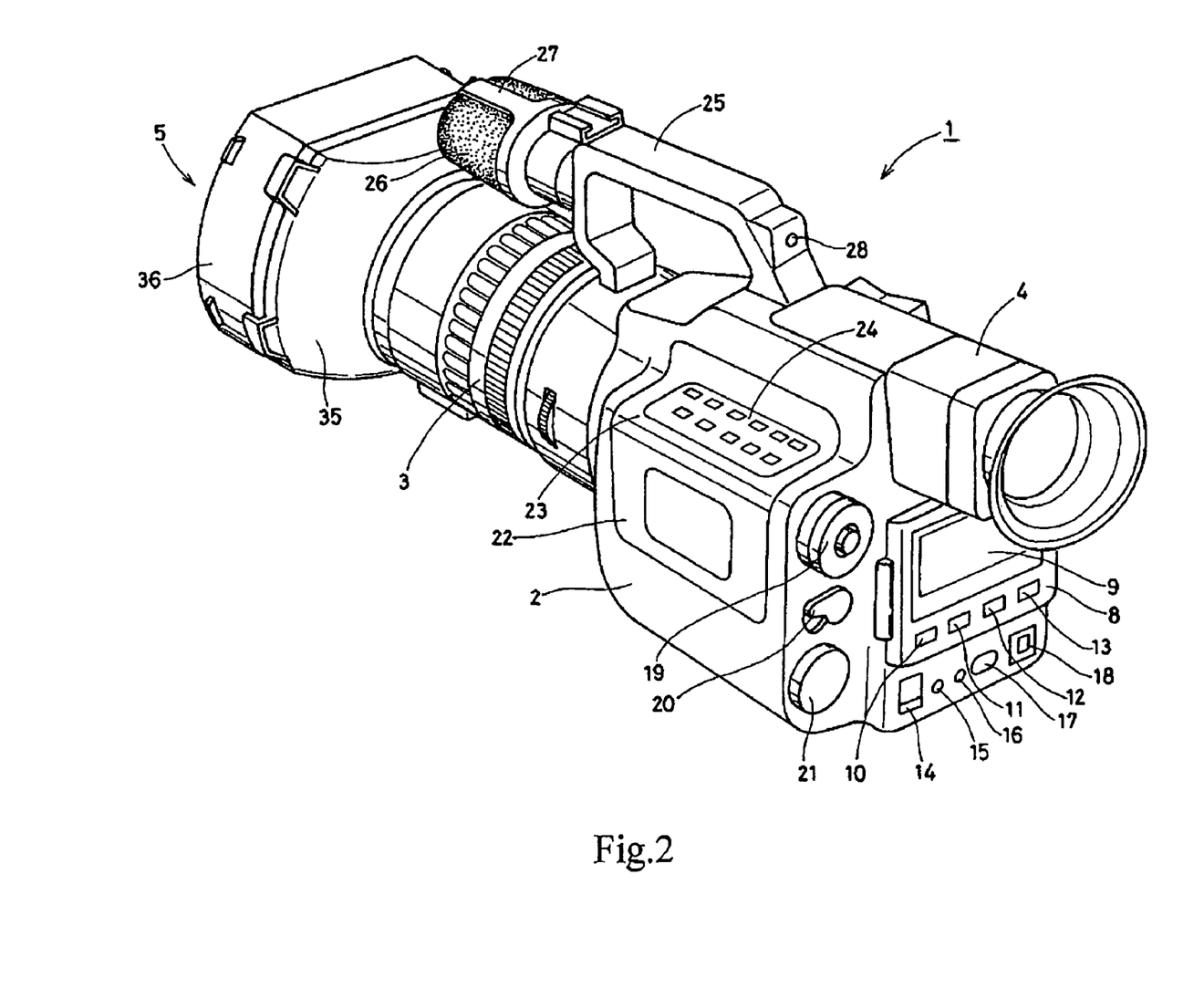
FIG. 2 is a perspective view of the video camera, as viewed from the rear side.

Now, an embodiment of the present invention will be described below referring to FIGS. 1 to 3. FIGS. 1 and 2 show the appearance of a video camera 1 according to this embodiment, in which a VTR mechanism, a battery as a power supply, and the like are incorporated in a main body 2, a shooting lens 3 is mounted on the front side, and a view finder 4 is provided on the rear half side in the state of being flat-layable and raisable to the rear side.

Figure 3:
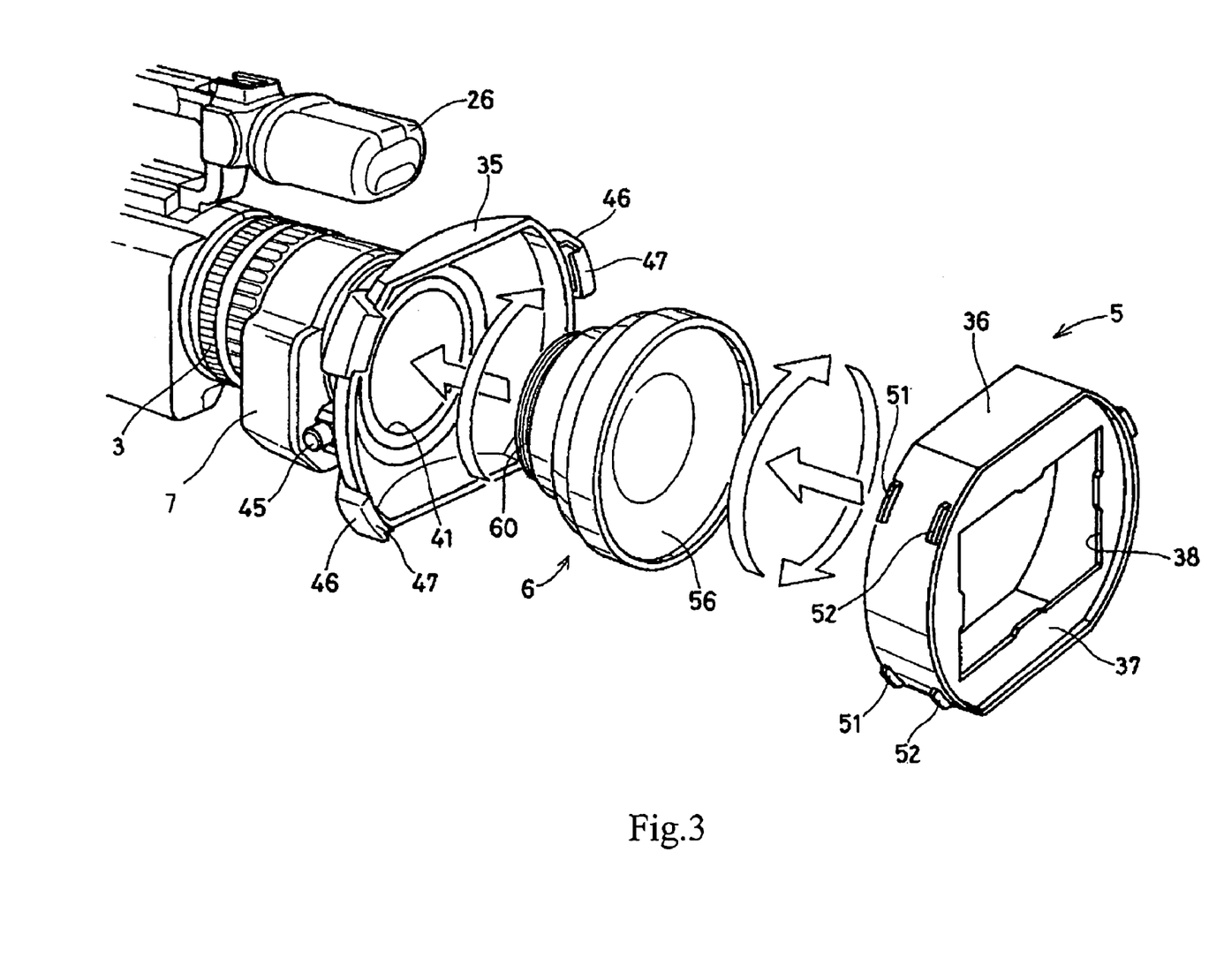
FIG. 3 is an exploded perspective view showing the structure for mounting a lens hood portion to an optical system.

A lens hood 5 is mounted on the front side of the shooting lens 3 constituting an optical system in the video camera 1, through an adapter 7 shown in FIG. 3, and a conversion lens 6 can be detachably mounted inside the lens hood 5. The configurations of the lens hood 5 and the conversion lens 6 will be described in detail later.

A lid 8 for opening and closing a battery containing portion is provided on the rear side of the main body 2 of the video camera 1. A liquid crystal display panel 9 is attached to the outer surface side of the lid 8, and a program AE button 10, a shutter speed button 11, a white balance button 12, and a sound recording level button 13 are arranged on the lower side of the liquid crystal display panel 9. A lid opening switch 14, a zero set memory button 15, a self-timer button 16, a one-push white balance button 17, and a DV terminal 18 are laid out at a portion on the lower side of the lid 8. A power source switch 19, an auto-lock switch 20, and a control switch 21 are arranged on a side portion on the rear side of the main body 2.

A lid for opening and closing a tape cassette loading portion in the main body 2 is composed of two lids, i.e., a main lid 22 and a sub-lid 23, for a two-stage opening/closing operation, in which the main lid 22 is opened after the sub-lid 23 is opened at the time of opening, and the sub-lid 23 is closed after the main lid 22 is closed at the time of closing. The sub-lid 23 is provided with a tape running operation portion 24 of the VTR mechanism. A handle 25 is mounted on the upper surface side of a front half of the main body 2 in the front-rear direction while being located on the upper side of the optical axis of the shooting lens 3, a stereo microphone 26 is mounted on the front end side of the handle 25 by a holder 27 in the state of being directed forwards along the optical axis of the shooting lens 3, a rear remote control light-receiving portion 28 is provided on the rear end surface of the handle 25, and a front remote control light-receiving portion 29 is provided on the front surface of the holder 27 for the stereo microphone 26.

Figure 4:
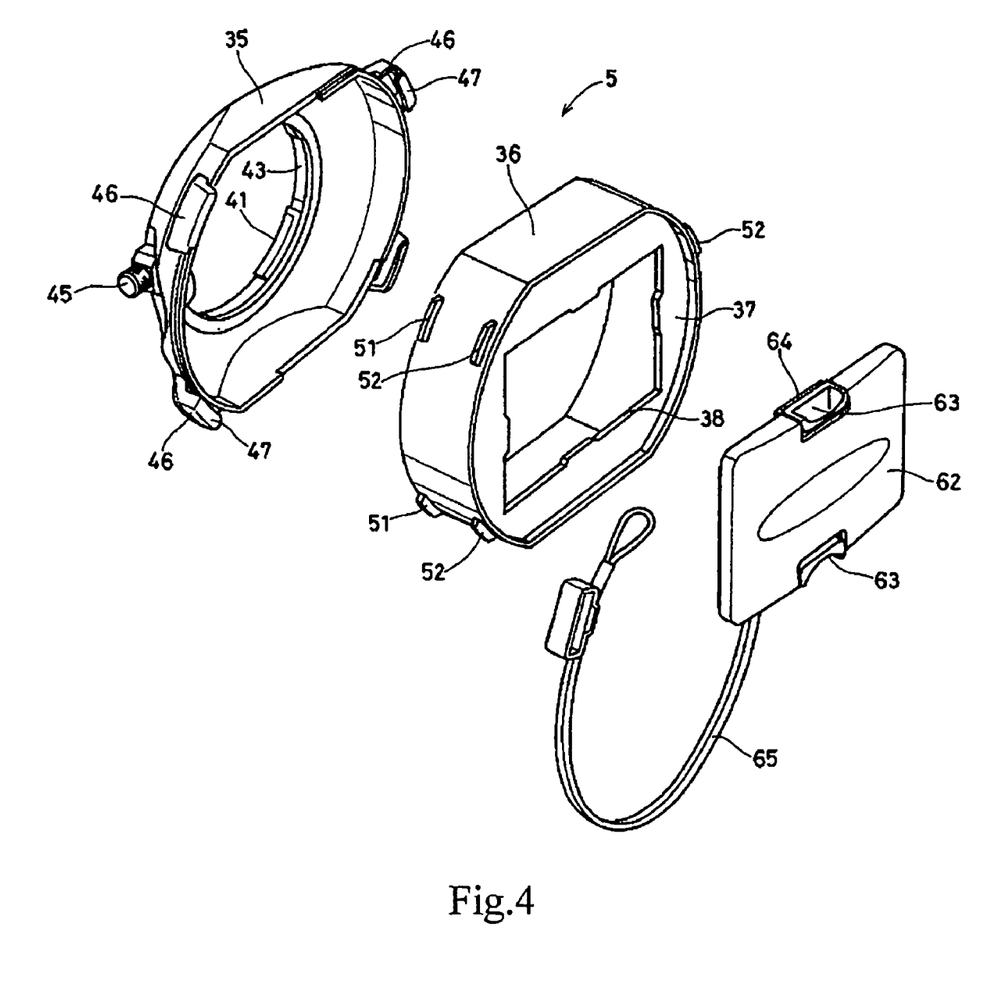
FIG. 4 is an exploded perspective view of the lens hood.

Now, the lens hood 5 mounted to the front end side of the shooting lens 3 constituting the optical system in the main body 1 of the video camera as above-mentioned will be described below. As shown particularly in FIG. 4, the lens hood 5 is composed of a base portion 35 mounted to a front end portion of the optical system through the adapter 7, and a tubular portion 36 detachably coupled to the base portion 35. A dowser 37 is provided in the tubular portion 36 so that the incident light is contracted by a rectangular opening 38 in the dowser 37.

Figure 5:
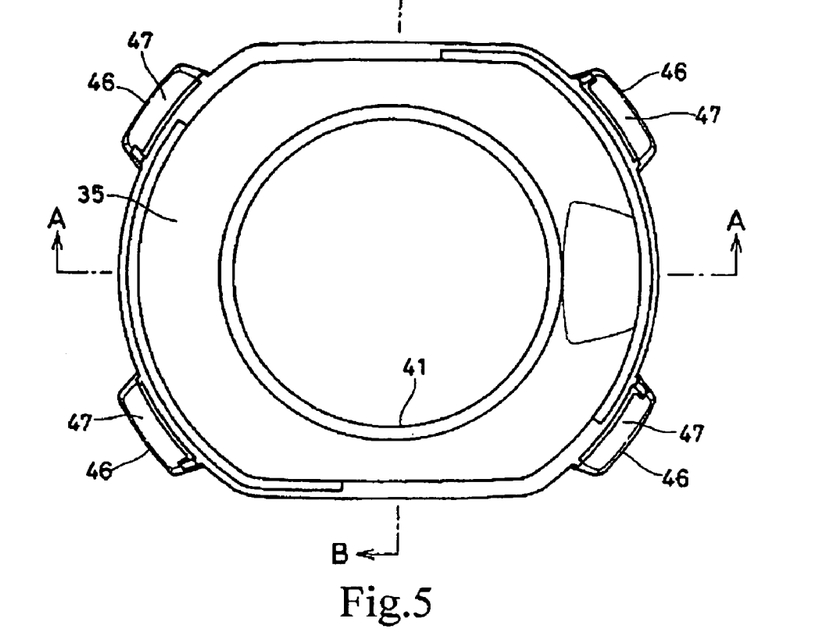
FIG. 5 is a front view of a base portion of the lens hood.
Figure 6:
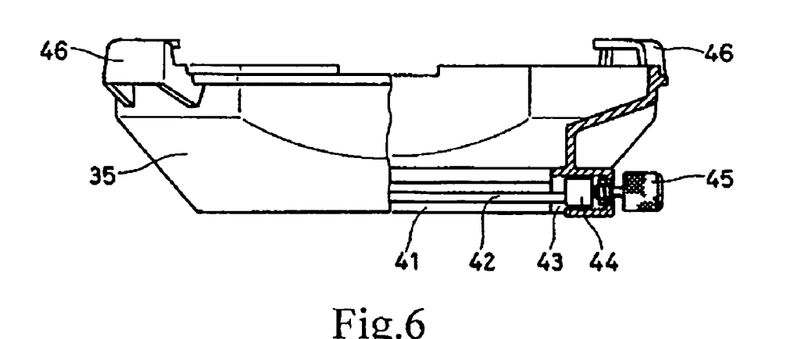
FIG. 6 is a sectional view along line A—A of FIG. 5.
Figure 7:
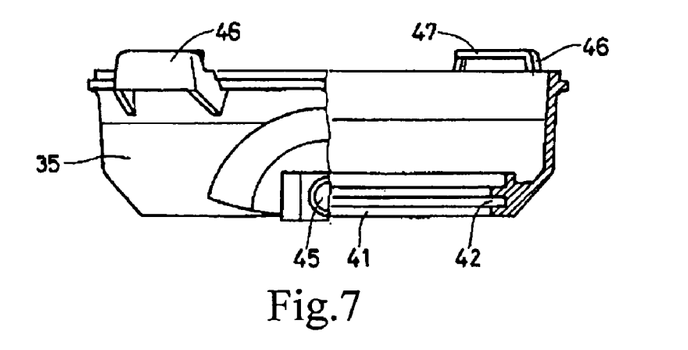
FIG. 7 is a sectional view along line B—B of FIG. 5.

Now, the configuration of the base portion 35 of the lens hood 5 will be described below. As shown in FIGS. 5 to 7, the base portion 35 is provided on its base end side with a circular opening 41, which is to be fitted over an outer peripheral portion on the front end side of the optical system. Specifically, the circular opening 41 is provided in its inner circumferential surface with a locking groove 42, and with an introducing portion 43 continuous with the locking groove 42, and a claw of the adapter 7 is introduced into the locking groove 42 through the introducing portion 43, whereby the base portion 35 is mounted to the front end portion of the shooting lens 3 through the adapter 7. In the mounted condition, the base portion 35 is fixed to the outer circumferential edge of the shooting lens 3 by a fixing piece 44. Specifically, with a fixing screw 45 driven in, the fixing piece 44 fixes the circular opening 41 of the base portion 35 onto the outer circumferential surface of the shooting lens 3.

Projected portions 46 are provided, at four positions along the circumferential direction, on the outer circumferential surface on the front end side of the base portion 35, and the projected portions 46 are provided with locking wall portions 47, respectively.

Figure 8:
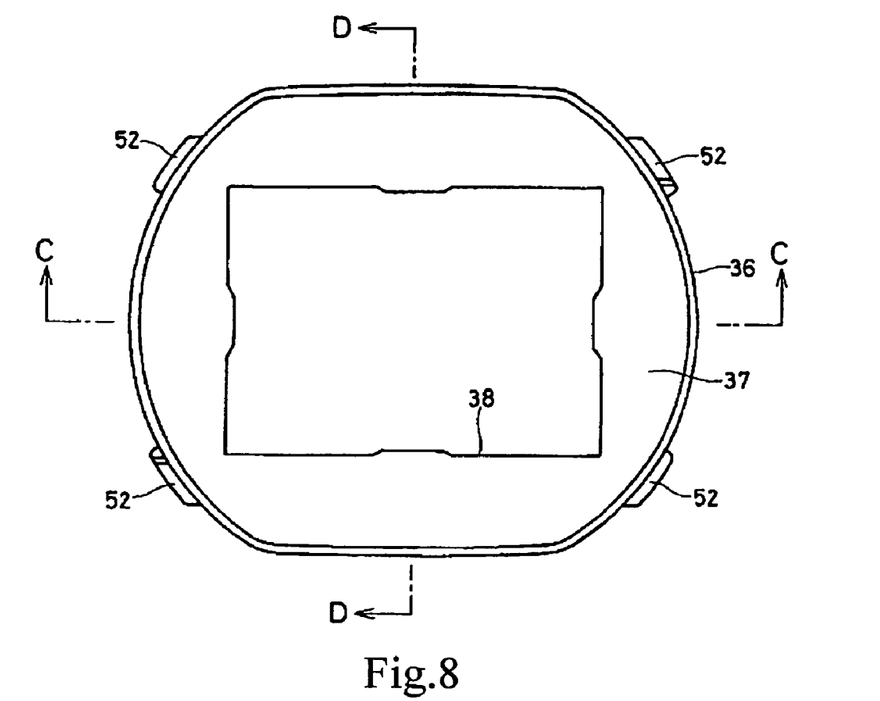
FIG. 8 is a front view of a tubular portion.
Figure 9:
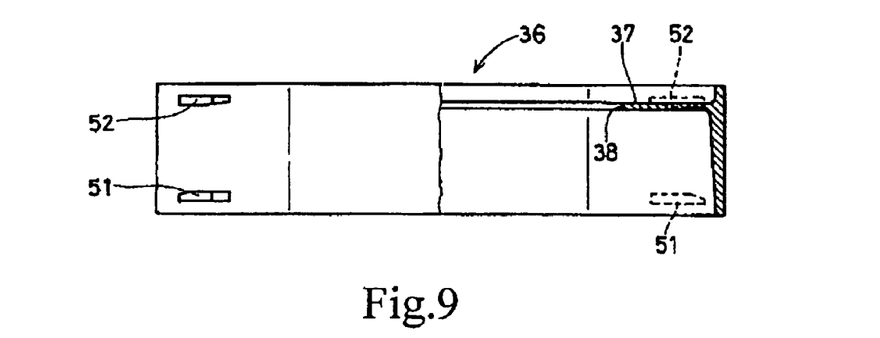
FIG. 9 is a sectional view along line C—C of FIG. 8.
Figure 10:
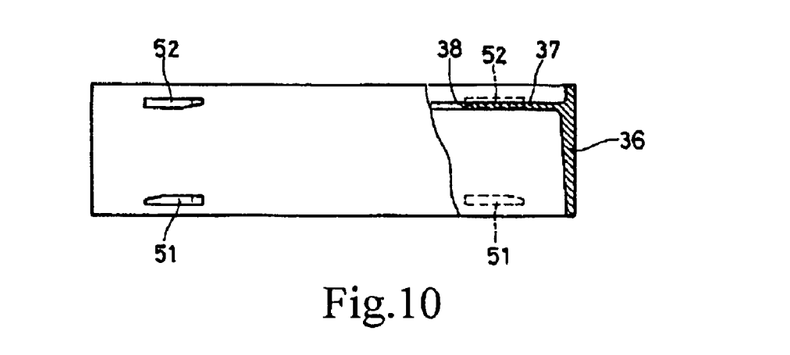
FIG. 10 is a sectional view along line D—D of FIG. 8.

Now, the tubular portion 36 of the lens hood 5 will be described below. As shown in FIGS. 8 to 10, the tubular portion 36 is composed of a non-circular tube which is short in the axial direction, the dowser 37 is provided so as to close the opening on one side of the tubular portion 36, and the dowser 37 is provided in its central portion with the opening 38 which is roughly rectangular. In addition, the tubular portion 36 is provided on its outer circumferential surface with lock claws 51, 52 respectively on the front and rear sides in the optical axis direction thereof. The lock claws 51 are located on the opposite side of the dowser 37 in the optical axis direction, whereas the lock claws 52 are located on an outer circumferential portion of the dowser 37 in the optical axis direction. The tubular portion 36 is coupled to the base portion 35 by any of these lock claws 51, 52. Specifically, the lock claws 51, 52 constitute bayonet claws, and the tubular portion 36 is locked to the locking wall portions 47 of the projected portions 46 of the base portion 35 by the bayonet coupling.

Figure 11:
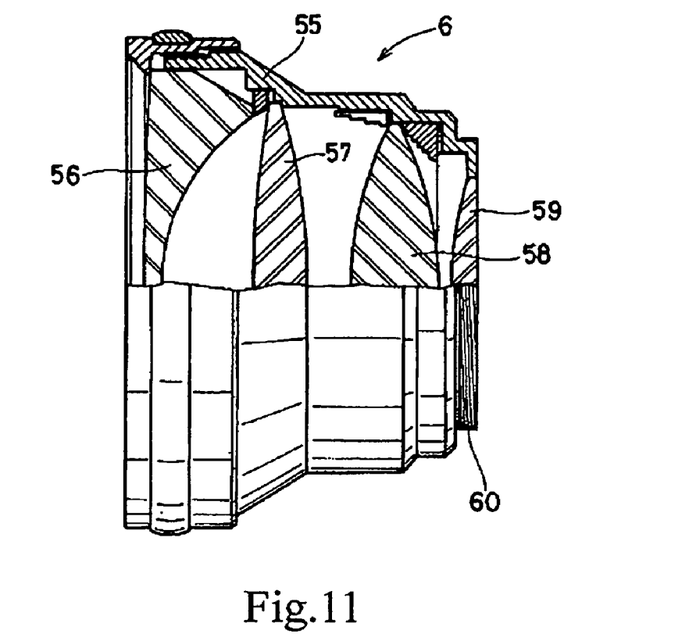
FIG. 11 is a partly broken side view of a conversion lens.

Now, the conversion lens 6 contained in the lens hood 5 as shown in FIG. 3 will be described below, referring to FIGS. 11 and 12. As shown in FIG. 11, the conversion lens 6 is provided with a tube body 55, and lenses 56, 57, 58, 59 are mounted and fixed in the tube body 55 along the axial direction. The tube body 55 is provided with a coupling screw 60 in the outer circumferential surface of a base end side portion thereof, and the coupling screw 60 is put into screw engagement with a female screw provided in an inner circumferential surface on the front end side of the shooting lens 3.

Now, a cap 62 so attached as to close the rectangular opening 38 in the dowser 37 of the tubular portion 36 on the front end side of the lens hood 5 will be described below. The cap 62 is provided with a pair of lock pieces 63 respectively at upper and lower portions thereof, and the lock pieces 63 are so mounted as to be projected respectively in the upward and downward directions by springs incorporated therein. Lock grooves 64 provided respectively in the upper and lower surfaces of the lock pieces 63 are engaged with the circumferential edge portion of the rectangular opening 38 in the dowser 37, whereby the cap 62 is locked in the state of closing the rectangular opening 38 of the dowser 37. In addition, a strap 65 is attached to the cap 62.

Figure 12:
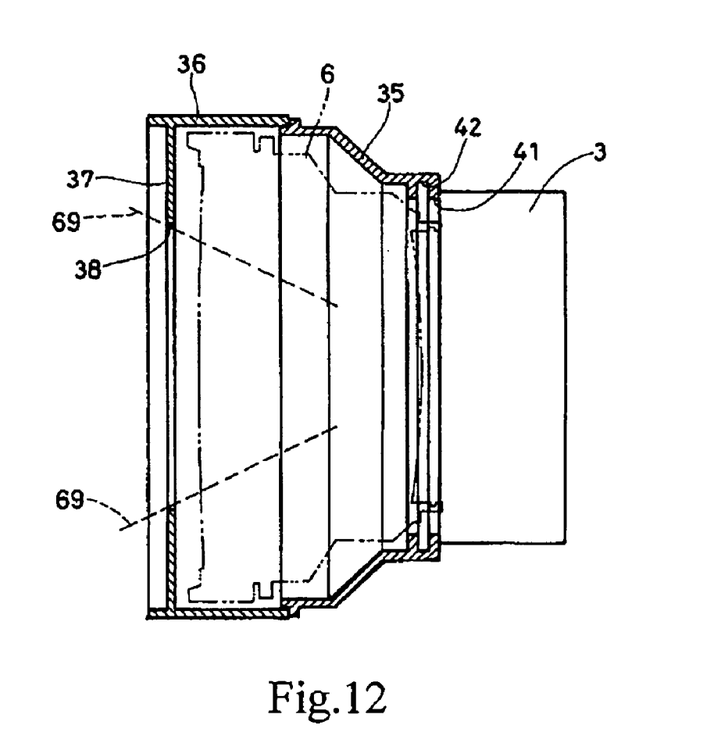
FIG. 12 is a vertical sectional view showing the incident light contracting condition when the conversion lens is contained in the lens hood.

Here, a great characteristic feature of the lens hood 5 lies in that the lens hood 5 can be used in the condition where the conversion lens 6 for widening the angle of view is coupled to the front end side of the optical system as shown in FIG. 12. To be more specific, the base portion 35 of the lens hood 5 is coupled to the tip end side of the shooting lens 3 by means of the lock groove 42. Then, in this condition, the coupling screw 60 on the base end side of the tube body 55 of the conversion lens 6 is fixed by screw engagement with the female screw on the front end side of the shooting lens 3, via the opening portion on the front side of the base portion 35. As a result, the conversion lens 6 is coupled and fixed to the front end portion of the shooting lens 3 through the coupling screw 60.

Subsequently, further, the tubular portion 36 of the lens hood 5 is coupled to the front side of the base portion 35. In this case, the dowser 37 of the tubular portion 36 is located on the front side as shown in FIG. 12, whereby the dowser 37 is prevented from interfering with the conversion lens 6. In this condition, the lock claws 51 are locked to the locking wall portions 47 of the projected portions 46 of the base portion 35 by the bayonet coupling, whereby the lens hood 5 is assembled in the condition where the tubular portion 36 is coupled to the base portion 35.

In this instance, the rectangular opening 38 in the dowser 37 of the tubular portion 36 is located immediately on the front side of the conversion lens 6, and the incident light is contracted as indicated by broken lines 69 by the light-shielding effect of the rectangular opening 38. Therefore, it is possible to obviate the problem that when a point light source is put into an object at the time of shooting by the video camera, non-imaging light reflected on the air-glass joint plane of the shooting lens 3 and the like reaches the image pickup screen to produce irregular light spots, leading to the generation of flare and to a trouble in shooting.

Figure 13:
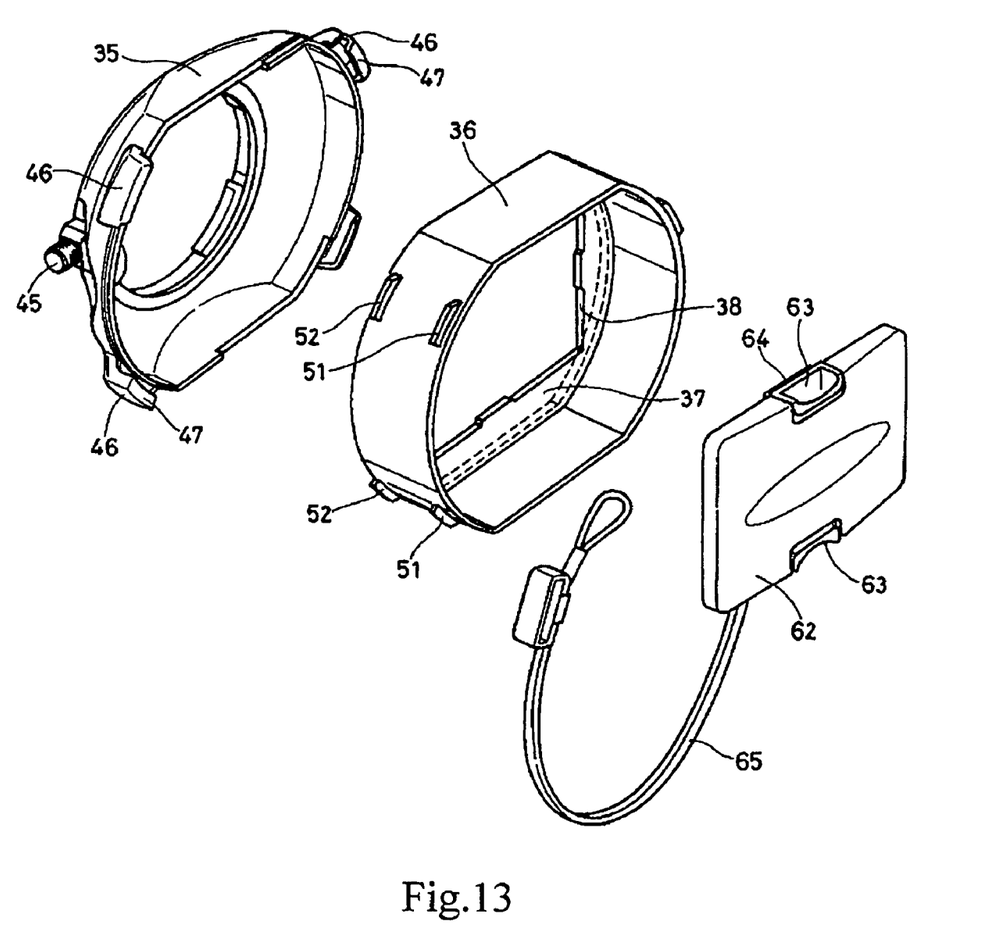
FIG. 13 is an exploded perspective view showing the assembly of the lens hood in the case of not using the conversion lens.
Figure 14:
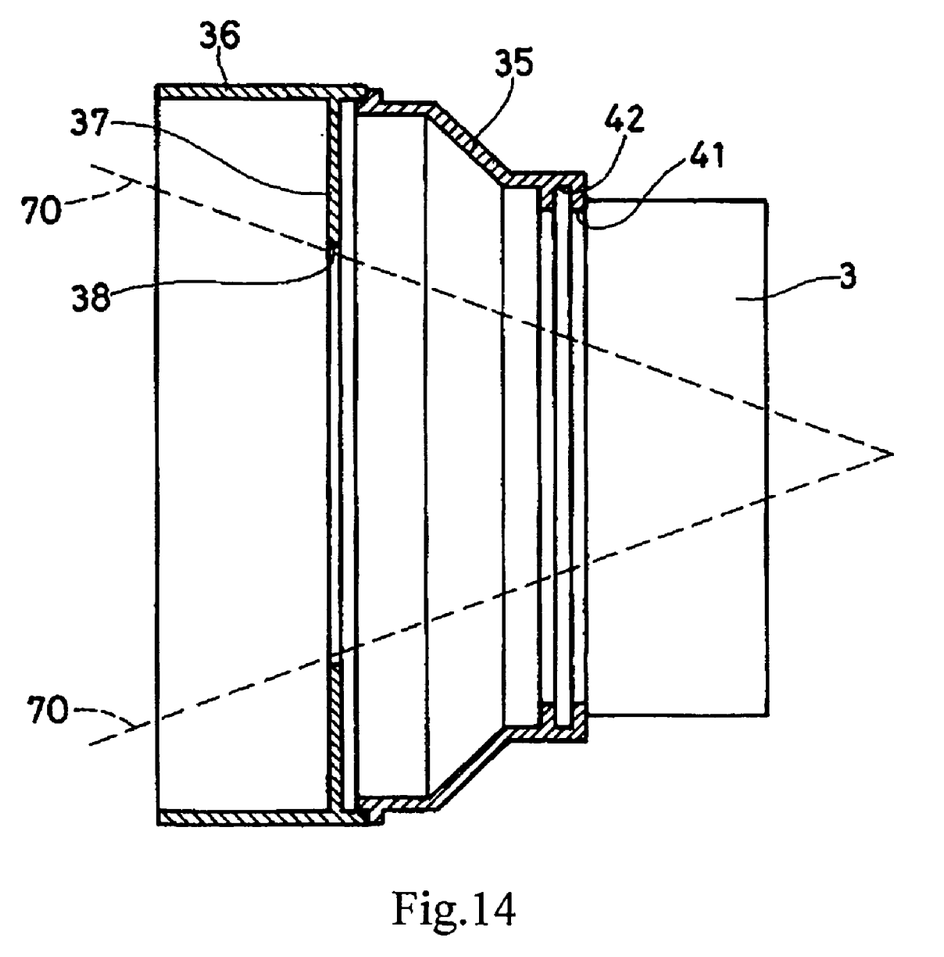
FIG. 14 is a vertical sectional view showing the incident light contracting operation by a dowser of the tubular portion in the case of not using the conversion lens.

In the case of not using the conversion lens 6, the video camera is used in the manner as shown in FIGS. 13 and 14. Specifically, the base portion 35 is first mounted to the front end of the shooting lens 3, and the tubular portion 36 is mounted to the base portion 35. In this case, the lock claws 52 on the side of the dowser 37 of the tubular portion 36 are fixed by engagement with the locking wall portions 47 of the projected portions 46 of the base portion 35. This ensures that the tubular portion 36 can be mounted in such a posture that the dowser 37 having the rectangular opening 38 is close to the shooting lens 3. Besides, in this case, the light shielding by the rectangular opening 38 of the dowser 37 is as indicated by broken lines 70 in FIG. 14, whereby the incident light is contracted, and generation of flare is obviated.

Thus, the video camera 1 in this embodiment has a configuration in which the lens hood 5 is composed of the base portion 35 and the tubular portion 36, which are detachably coupled to each other, and the conversion lens 6 can be mounted between the base portion 35 and the tubular portion 36 of the lens hood 5 as shown in FIG. 12, whereby the video camera 1 can be used in the same and good outer shape irrespectively of whether the conversion lens 6 is mounted or dismounted. Also, in the case of using the conversion lens 6, the form for permitting the conversion lens 6 to be contained into the lens hood 5 by simply detaching and attaching the tubular portion 36 without dismounting the lens hood 5 can be obtained, and the use of the conversion lens 6 is enabled directly.

In addition, by mounting the tubular portion 36 to the base portion 35 while reversing the mounting posture in the front-rear direction, the condition shown in FIG. 12 and the condition shown in FIG. 14 can be selectively adopted, whereby it is possible to obtain the light-shielding effect by the rectangular opening 38 in the dowser 37 in any of the two conditions. Specifically, in the case of not using the conversion lens 6, the tubular portion 36 is reversed in the front-rear direction as shown in FIG. 14, before being coupled to the base portion 35, whereby the light-shielding effect of the usual lens hood 5 can be obtained.

While the present invention has been described above referring to the embodiment shown in the drawings, the present invention is not limited to the above-described embodiment, and various modifications are possible within the scope of the technical thought of the invention. For example, while the above-described embodiment pertains to the video camera with the VTR incorporated inside the main body 2, the present invention is applicable also to other various image pickup apparatus, for example, digital still cameras, etc.

INDUSTRIAL APPLICABILITY

The present invention is widely applicable to various image pickup apparatus, such as video cameras and still cameras.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An image pickup apparatus comprising:
a lens hood mounted on a front side of an optical system, wherein said lens hood is composed of a base portion on a mounting side and a tubular portion on the front side, said base portion and said tubular portion are detachably coupled to each other; and
another lens is located between said base portion and said tubular portion when said another lens is mounted on the front side of said optical system, wherein a dowser is provided on an inside of said tubular portion of said lens hood, and an incident light is contracted by an opening of said dowser, and
wherein a cap is detachably attached to said opening in said dowser of said tubular portion of said lens hood.

2. An image pickup apparatus as set forth in claim 1, wherein said tubular portion and said base portion of said lens hood are detachably coupled to each other by a bayonet claw.

3. An image pickup apparatus as set forth in claim 1, wherein said another lens is a wide conversion lens for widening an image pickup angle.

4. An image pickup apparatus comprising:
a lens hood mounted on a front side of an optical system, wherein said lens hood is composed of a base portion on a mounting side and a tubular portion on the front side, said base portion and said tubular portion are detachably coupled to each other; and
another lens is located between said base portion and said tubular portion when said another lens is mounted on the front side of said optical system,
wherein a dowser is provided on the inside of said tubular portion in a biased state in an optical axis direction, said tubular portion can be detachably coupled to said base portion irrespectively of whether said dowser is in a posture of being close to said optical system or in a posture of being apart from said optical system, and said tubular portion is coupled to said base portion in such a posture that said dowser is apart from said optical system where said another lens is mounted on the front side of said optical system and contained in the inside of said lens hood, and wherein said another lens is a wide conversion lens for widening an image pickup angle.

5. An image pickup apparatus comprising:
a lens hood mounted on a front side of an optical system, wherein said lens hood is composed of a base portion on a mounting side and a tubular portion on the front side, said base portion and said tubular portion are detachably coupled to each other; and
another lens is located between said base portion and said tubular portion when said another lens is mounted on the front side of said optical system,
wherein a dowser is provided on the inside of said tubular portion in a biased state in an optical axis direction, said tubular portion can be detachably coupled to said base portion irrespectively of whether said dowser is in a posture of being close to said optical system or in a posture of being apart from said optical system, and said tubular portion is coupled to said base portion in such a posture that said dowser is close to said optical system, where said another lens is not mounted, and wherein said another lens is a wide conversion lens for widening an image pickup angle.

* * * * *